H. M. WEITZELL.
HARROW AND ATTACHMENT THEREFOR.
APPLICATION FILED JULY 11, 1917.

1,313,144.

Patented Aug. 12, 1919.
2 SHEETS—SHEET 2.

Witnesses

Inventor
Harry M. Weitzell
By D. Swift & Co.
Attorneys

UNITED STATES PATENT OFFICE.

HARRY M. WEITZELL, OF LEGRAND, IOWA.

HARROW AND ATTACHMENT THEREFOR.

1,313,144.  Specification of Letters Patent.  Patented Aug. 12, 1919.

Application filed July 11, 1917.  Serial No. 179,925.

*To all whom it may concern:*

Be it known that I, HARRY M. WEITZELL, a citizen of the United States, residing at Legrand, in the county of Marshall, State of Iowa, have invented a new and useful Harrow and Attachment Therefor; and I do hereby declare the following to be a full, clear, and exact description of the invention, such as will enable others skilled in the art to which it appertains to make and use the same.

This invention relates to the art of harrows and particularly to an improved attachment for such devices consisting of supporting means for the harrow, when the teeth are not in use.

One of the objects of the invention is the provision of a harrow having adjustable harrow teeth and means for adjusting the teeth simultaneously, in combination with means, whereby, when the teeth are not in use, said means are thrown into position to support the harrow, whereby the same may be moved from one place to another.

A further object of the invention is the provision of a rocking rod having a series of harrow teeth and provided with supporting wheels offset at right angles to the teeth and with their axes in planes corresponding to the planes of the teeth, whereby as the rod is rocked in one direction, the teeth may be thrown in engagement with the ground or soil and the supporting wheels out of engagement with the soil, and when rocked in the opposite direction, the supporting wheels are thrown in engagement with the ground or soil, and the teeth out of engagement with the soil, and vice versa.

In practical fields, the details of construction may necessitate alterations falling within the scope of what is claimed.

The invention comprises further features and combination of parts, as hereinafter set forth, shown in the drawings and claimed.

In the drawings:—

Figure 1:
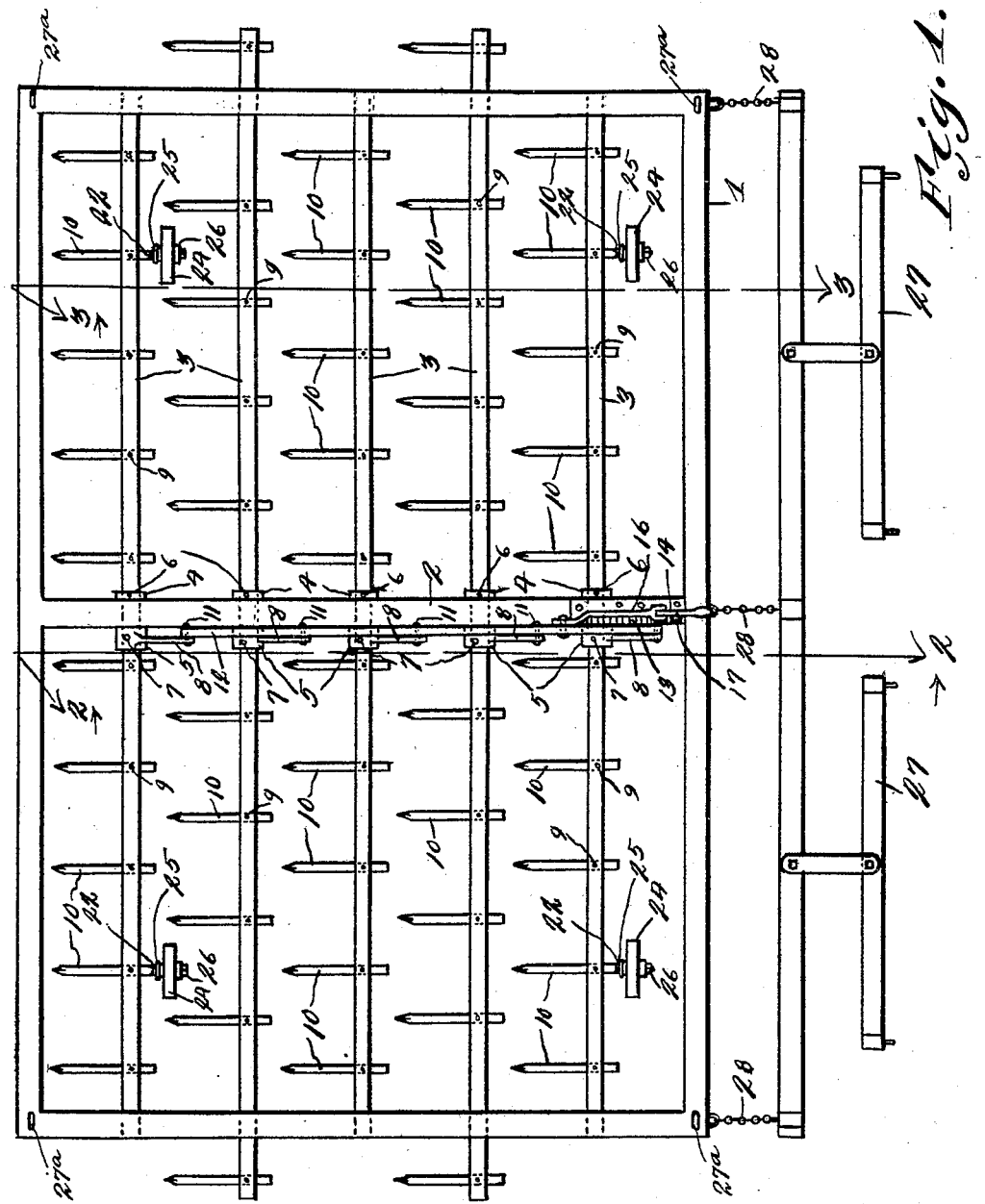
Figure 1 is a plan view of a harrow, showing the improved adjustable harrow teeth and supporting wheels therefor.
Figure 2:
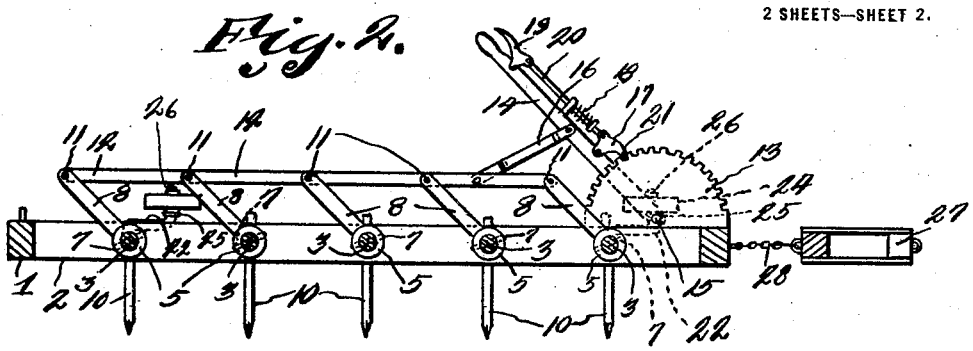
Fig. 2 is a sectional view on line 2—2 of Fig. 1.
Figure 3:
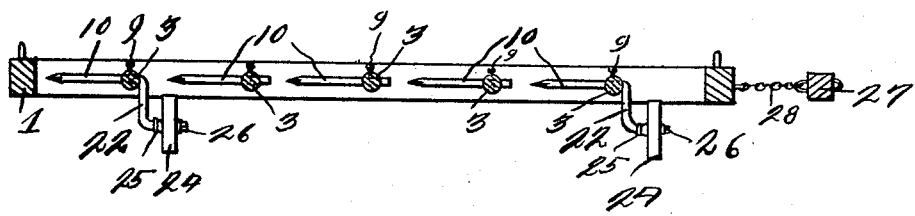
Fig. 3 is a sectional view on line 3—3 of Fig. 1.
Figure 4:
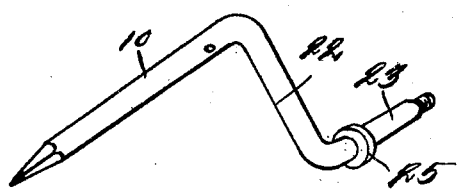
Fig. 4 is a detail perspective view of one of the harrow teeth, showing one end constructed to support one of the supporting wheels.

Referring more especially to the drawings, 1 designates a rectangular harrow frame having an intermediate transverse bar 2, in bearings of which and the end bars of the frame, a plurality of rocking rods 3 are journaled. Mounted upon the rods 3, is a plurality of collars 4 and 5, the collars 4 being secured at 6 on said rods and adjacent one side of the intermediate bar 2, while the collars 5 are secured at 7 on said rods adjacent the other side of the bar 2. Projecting radially from and forming integral parts of the collars 5, are arms 8. Extending transversely of the rocking rods 3, and secured by the pins 9, are harrow teeth 10, which extend downwardly to engage the soil. The arms 8 extending rearwardly and upwardly and at obtuse angles to the teeth. Connected by the pivot pins 11 to the ends of the arms 8, is a connecting bar 12, so that when the bar 12 is moved in one direction or the other, forwardly or rearwardly, the arms 8 are moved simultaneously, and also the rods are rocked synchronously as well as the teeth. Mounted upon the forward part of the frame 1 is a segment rack 13 to which a lever 14 is pivoted as at 15, there being a link 16 connecting the lever and the bar 12. A suitable dog 17, which is under tension of the spring 18, and is designed to be operated by the hand grip 19 (which is connected to the dog by the rod 20) is pivotally mounted upon the lever 14, whereby the nose 21 of the dog is adapted to engage between any two of the teeth of said segment. By adjusting the lever 14 forwardly or rearwardly, the teeth 10 may be adjusted at different angles, as the case may require, to properly harrow the ground or soil. Two of the teeth 10 of the forward and rear rocking rods are provided with right angle extensions 22, which, when the teeth extend downwardly, assume horizontal positions. When the teeth are disposed horizontally, the extensions 22 extend downwardly and vertically. The teeth that carry the extensions 22 are located adjacent the sides of the frame and are positioned forwardly and rearwardly with relation to the frame. The extensions 22 are provided with right angle extensions 23, which extend in planes corresponding to the planes of the teeth, and have journaled thereon suitable supporting or caster wheels 24, which are disposed between the collars 25 and the nuts 26, which are threaded on the threaded extensions of the parts 23. It is to be noted that when the lever 14 is adjusted or moved far enough toward the rear, the harrow teeth are adjusted to extend downwardly in engagement with the soil. When the operator has finished harrowing the ground or soil, it becomes necessary to remove the harrow from the field, and to accomplish this, the lever 14 is moved forwardly as far as necessary, whereby the teeth 10 may be disposed horizontally, and the extensions 22 disposed downwardly, so that the supporting wheels or casters may engage the soil or ground, whereby, upon attaching draft animals to the equalizer to be attached to either set of eyes 27ª of the frame 1, the harrow may be drawn from the field, without the teeth engaging the soil. The set of eyes 27ª at each side of the frame 1 are designed to be engaged by chains of another equalizer (not shown), whereby the harrow frame may be drawn narrow-wise through gates.

The invention having been set forth, what is claimed as new and useful, is:—

1. In a harrow, a rectangular frame, a plurality of rocking rods extending transversely of and mounted in bearings of said frame and provided with harrow teeth, said rods having arms extending upwardly and rearwardly and at obtuse angles to the teeth, a bar connecting said arms, and means connected to the bars, whereby upon moving the same forwardly or rearwardly, said teeth may be thrown upwardly into horizontal positions out of engagement with the soil, two of the teeth of the forward and rear rods having offset extensions provided with supporting caster wheels, which are designed to engage the soil when the teeth are thrown horizontally.

2. In a harrow, a frame, a plurality of rocking rods journaled transversely and in bearings of said frame and provided with harrow teeth, means for rocking the rods simultaneously, whereby the teeth may be extended downwardly or horizontally, a tooth adjacent each end of each forward and rear rocking rod having a right angle extension, which is provided with an auxiliary extension extending in a plane corresponding to that of the tooth, and having a caster wheel journaled thereon, whereby, when the tooth has been thrown horizontally, the wheel is moved to extend downwardly in engagement with the soil.

In testimony whereof I have signed my name to this specification in the presence of two subscribing witnesses.

HARRY M. WEITZELL.

Witnesses:
A. H. WEITZELL,
BERTRAM E. SAWYER.

Copies of this patent may be obtained for five cents each, by addressing the "Commissioner of Patents, Washington, D. C."